United States Patent [19]

Paul et al.

[11] Patent Number: 4,727,106

[45] Date of Patent: Feb. 23, 1988

[54] USE OF METAL SALTS WITH SUPERPOLYAMIDES AS OXYMETHYLENE POLYMER STABILIZERS

[75] Inventors: James L. Paul, Summit; Andrew B. Auerbach, Livingston, both of N.J.

[73] Assignee: Celanese Engineering Resins, Inc., Chatham, N.J.

[21] Appl. No.: 932,235

[22] Filed: Nov. 18, 1986

[51] Int. Cl.⁴ .......................... C08K 5/13; C08K 5/09
[52] U.S. Cl. .................................. 524/380; 524/382; 524/398; 524/593
[58] Field of Search ............... 524/398, 380, 382, 593, 524/327; 525/427

[56] References Cited

U.S. PATENT DOCUMENTS

| | | | |
|---|---|---|---|
| 3,442,850 | 5/1969 | O'Brien et al. | 524/593 |
| 3,484,399 | 12/1969 | Kakos, Jr. | 260/18 |
| 3,484,400 | 12/1969 | Halek | 260/18 |
| 3,485,793 | 12/1969 | Busse et al. | 260/45.75 |
| 3,488,303 | 1/1970 | Heinz | 260/18 |
| 3,699,062 | 10/1972 | Starr et al. | 525/427 |

FOREIGN PATENT DOCUMENTS 54-13551 2/1979 Japan .

*Primary Examiner*—Veronica P. Hoke
*Attorney, Agent, or Firm*—Depaoli & O'Brien

[57] ABSTRACT

An oxymethylene polymer composition which exhibits improved thermal stability is provided by utilizing as a stabilizer a major amount of superpolyamide and a minor amount of a transition metal salt.

19 Claims, No Drawings

USE OF METAL SALTS WITH SUPERPOLYAMIDES AS OXYMETHYLENE POLYMER STABILIZERS

FIELD OF THE INVENTION

The present invention relates to stabilized oxymethylene polymers. More particularly, it relates to oxymethylene polymers employing superpolyamide stabilizers which exhibit improved thermal stability properties.

BACKGROUND OF THE INVENTION

The term oxymethylene polymer as used herein is meant to include oxymethylene homopolymers and diethers and diesters. Also included are oxymethylene copolymers, which include oxymethylene polymers having at least 60 percent recurring oxymethylene units and at least one other unit derived from a monomer copolymerizable with the source of the oxymethylene units.

Oxymethylene polymers having recurring —CH$_2$O— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, on the catalytic polymerization technique employed and upon the various types of comonomers which may be incorporated into the polymer.

While the high molecular weight oxymethylene polymers are relatively thermally stable, various treatments have been proposed to increase the polymers utility by increasing thermal stability. Among these are end capping of hemiformal groups of polyoxymethylene homopolymers and hydrolysis to remove unstable groups of oxymethylene in copolymers containing interspersed stable units, such as ethoxy groups. Even beyond these treatments, it has been found necessary to incorporate various stabilizers, antioxidants and chain-scission inhibitors into the polymers.

Unfortunately oxymethylene polymers are subject to degradation, particularly under the influence of heat. The degradation results mainly from the following three processes:

1. Thermal degradation of the chain end with liberation of gaseous formaldehyde. This degradation which takes place largely under the influence of heat, is often obviated by the presence of either an ether or an ester group at the end of the polymer chain.

2. Oxidative attack leading to chain scission and depolymerization. This is often retarded by the addition of antioxidants to the composition such as compounds containing phenolic or amino groups.

3. Acidolytic cleavage of the chain may occur which also liberates formaldehyde. Acidolytic degradation arises from the presence of acidic species originating from one of several sources: (A) acidic catalyst residues which may have been used in preparation of the polymer, (B) formic acid formed in situ when the trace quantities of formaldehyde generated in processing are oxidized, and (C) acetic acid generated from acetate end groups when a given chain, so stabilized, depolymerizes as a result of occasional oxidative or acidolytic chain scission. To alleviate this condition and to prevent degradation of the polyoxymethylene copolymer especially during subsequent processing in the hot state, "formaldehyde acceptors" or "acid scavengers" are often admixed with the polymer composition. Among the compounds which can be used for this purpose are hydrazines and their derivatives, ureas, certain amides and diamides, polyamides, and metallic salts of acetic acid and fatty acids.

Among the most successful and widely used thermal stabilizers are nitrogen-containing compounds which function as formaldehyde acceptors and acid scavengers. These have been found to be effective in lowering the thermal degradation rate of the polymer.

A particularly preferred stabilizer and one that has found use in commercial applications is characterized as a superpolyamide. The superpolyamide stabilizers are the macromolecular superpolyamides, commonly known as nylons, that have carboxamide linkages

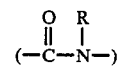

as integral portions of their polymer chains. These superpolyamides preferably have melting points below approximately 220° C., in which R represents a hydrogen atom, a lower alkyl group, or a lower alkoxy group, and have a degree of polymerization of approximately 100 to 200. A preferred group of the superpolyamides includes those condensation polymers that on hydrolysis yield either omega-aminocarboxylic acids or mixtures of dicarboxylic acids and diamines.

It has been taught that the various nitrogen-containing stabilizers, e.g., polyamides, poly(vinylpyrrolidone), the various acrylamide copolymers, melamine, cyanoguanamine, nitrilotrispropionamide and the like that have been added as acid scavengers have been found to cause an amine-like or fishy odor, which is undesirable when using the oxymethylene polymer as a container for packaging consumer goods. Thus, various metal salts of non-nitrogenous organic carboxylic acids and alcohols have been suggested as a thermal or chain-scission inhibitor for use with oxymethylene polymers in place of the nitrogen-containing stabilizers. For example, U.S. Pat. No. 3,488,303 discloses using a salt selected from the group consisting of lanthanide metal salts of non-nitrogenous organic carboxylic acids and alcohols, while U.S. Pat. No. 3,484,399 and '400 disclose using metal salts of non-nitrogenous organic acids and alcohols in which the salt is prepared from alkali or alkaline earth metals, zinc, aluminum, tin and other metals. It has been found, however, that at the levels required to prevent substantial thermal degradation of the oxymethylene polymer, the metal salts greatly discolor the molded articles.

Accordingly, there is a need to improve the thermal stabilization of oxymethylene polymers and, in particular, to improve upon the thermal degradation properties of an oxymethylene polymer which has been stabilized with a superpolyamide. The present invention is directed to such need.

SUMMARY OF THE INVENTION

The present invention provides stabilized oxymethylene polymer compositions which exhibit a reduced tendency to form mold deposits upon molding, improved thermal degradation properties and maintain the low level of free formaldehyde characteristic of oxymethylene polymers which have been stabilized with superpolyamides. The compositions of the present invention comprise an oxymethylene polymer and as a thermal stabilizer therefore a major amount of a superpolyamide stabilizer and minor proportions of a costabilizer comprising transition metal salts of organic acids and alcohols.

It has been found that using very low levels of transition metal salts as a costabilizer with a superpolyamide, the thermal degradation properties of an oxymethylene polymer stabilized with the same are substantially improved as compared with oxymethylene polymers which are stabilized solely with a superpolyamide. Consequently, it is now possible to reduce the level of superpolyamide stabilizer in the oxymethylene polymer composition thereby minimizing the problems with black specks and mold deposit problems associated with the superpolyamide stabilizer. The amount of transition metal salt utilized as a costabilizer in accordance with the present invention is substantially less than the practical amounts suggested in the prior art to provide improved thermal stability to oxymethylene polymers.

DESCRIPTION OF THE PREFERRED EMBODIMENTS

The oxymethylene polymer used in the compositions of the present invention is well known in the art. The polymers are characterized as having recurring oxymethylene groups or units, i.e., —CH$_2$O—. The term oxymethylene polymer as used herein is intended to include any oxymethylene polymer having —CH$_2$O— groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Ser. No. 691,143, filed Oct. 21, 1957, by Hudgin and Berardinelli now abandoned.

The homopolymers are usually stabilized against thermal degradation by end-capping.

Oxymethylene polymers that are particularly adapted for use in the compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) —OCH$_2$— groups interspersed with (b) groups represented by the general formula:

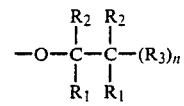

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH$_2$— units of (a) constitute from about 60 to about 99.6 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.4 to about 40 mole percent of a cyclic ether having at least two adjacent carbon atoms, preferably in the presence of a catalyst such as a Lewis acid (e.g, BF$_3$, PF$_5$, and the like) or other acids (e.g., HC10$_4$, 1% H$_2$SO$_4$, and the like).

In general, the cyclic ethers employed in making the preferred oxymethylene copolymers are those represented by the general formula:

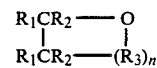

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

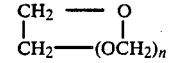

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers that are preferably present in the compositions of the present invention are thermoplastic materials having a melting point of at least 150° C., and normally are millable or processable at a temperature of from about 180° C. to about 200° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the compositions of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by either solution hydrolysis (hereinafter "SH") or melt hydrolysis (hereinafter "MH") to remove unstable groups. These processes degrade the hemiacetal end groups in the copolymer chain. Both processes are known to those skilled in the art and are in commerical practice. A useful solution hydrolysis process is disclosed in U.S. Pat. No. 3,179,948 and a useful melt hydrolysis process is disclosed in U.S. Pat. No. 3,318,848. If desired, the oxymethylene copolymer may be end-capped by techniques known to those skilled in the art. A preferred end-capping technique is accomplished by acetylation with acetic anhydride in the presence of sodium acetate catalyst.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

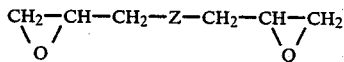

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1, 4-diol and 2-dimethyl-4-dimethyl-cyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

In some cases, it may be advantageous to use the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer.

The trioxane-based terpolymer polymerization is advantageously carried out at temperatures at which trioxane does not crystallize out, that is, at a temperature within the range of −50° C. to +100° C., depending on the solvent used, and in the absence of a solvent at a temperature within the range of +20° C. to +100° C.

As trioxane-based terpolymer polymerization catalyst, all substances may be used which are capable of initiating a cationic polymerization, for example, organic or inorganic acids, acid halides and, preferably, Lewis acids. Of the latter, boron fluoride and its complex compounds, for example, etherates of boron fluoride, are advantageously used. Diazonium fluoroborates are particularly advantageous.

The concentration of the catalyst may vary within the limits depending on the nature of the catalyst and on the intended molecular weight of the terpolymer. The concentration of the catalyst may be within the range of 0.0001 to 1 weight percent, calculated on the total monomer mixture, and is advantageously within the range of 0.001 to 0.1 weight percent.

Since the catalysts tend to decompose the terpolymer, the catalyst is advantageously neutralized immediately after the polymerization, for example, with ammonia or methanolic or acetonic amine solutions.

The unstable terminal hemiacetal groups may be removed from the terpolymer in the same manner as known for other oxymethylene polymers. Advantageously, the terpolymer is suspended in aqueous ammonia at temperature within the range of 100° to 200° C., and if desired, in the presence of a swelling agent such as methanol or n-propanol. Alternatively, the terpolymer is dissolved in an alkaline medium at temperatures above 100° C. and subsequently reprecipitated. Examples of suitable solvents are benzyl alcohol, ethylene glycol monoethyl ether or a mixture of 60 weight percent methanol and 40 weight percent water. Examples of suitable compounds having an alkaline reaction are ammonia and aliphatic amines.

It is also possible to thermally stabilize the terminal groups of the terpolymers in the absence of a solvent in the melt in the presence of a stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent based on the weight of the terpolymer. The terpolymer mixture is maintained at a temperature in the range of from about 170° to 250° C. for a specified period of time, and then washed with water and dried or centrifuged.

The oxymethylene polymers useful in this invention are primarily stabilized against thermal degradation by employing superpolyamides. The superpolyamides that may be present in the stabilizer systems of this invention are those already known in the art and previously described. Typically, the superpolyamides are formed by the condensation of dicarboxylic acids with diamines or by the polymerization of α-amino-monocarboxylic acids. These superpolyamides have a degree of polymerization in the range of about 100 to 200, and they preferably have melting points below about 220° C.

Among the useful superpolyamides are the condensation products of the following diamines and dicarboxylic acids: pentamethylenediamine/malonic acid; pentamethylenediamine/pimelic acid; hexamethylenediamine/adipic acid; hexamethylenediamine/sebacic acid; N,N'-hydroxymethylhexamethylenediamine/adipic acid; N,N'-methoxymethylhexamethylenediamine/adipic acid; octamethylenediamine/suberic acid; 1,1,6,6-tetramethylhexamethylenediamine/sebacic acid; decamethylenediamine/2,2,5,5-tetramethyladipic acid; and 2,5-dimethylpiperazine/glutaric acid. Also useful are the superpolyamides that are the self-condensation polymers derived, for example, from 6-aminocaproic acid, 9-aminononanoic acid, 11-aminoundecanoic acid or their lactams. Superpolyamides that are copolymers or terpolymers are also used. A particular preferred superpolyamide which has been used as a commercial stabilizer comprises a terpolymer of approximately 38% polycaprolactam/35% polyhexamethylene adipamide/27% polyhexamethylene sebacamide.

The transition metal salts which may be blended with the aforesaid oxymethylene polymers as costabilizers to form the improved compositions of this invention are transition metal salts of organic salts having from 2 through 30 carbon atoms, at least one carboxyl group, and preferably contain at least one primary, secondary or tertiary alcoholic hydroxyl group. In addition, transition metal salts of alcohols (primary, secondary, or tertiary alcohols) having from 2 through 30 carbon atoms, sometimes hereinafter referred to as alcoholates, may be used.

The transition metals or cations of the above salts include those metals of atomic number 21 through 80. Among the preferred transition metals or cations of the above include the iron group metals, i.e., iron, cobalt and nickel; lanthanide metals, and, in particular, lanthanum and cerium; chromium, manganese and copper. The cerium and copper salts seem to be the most effective in improving thermal degradation properties.

The transition metal salt component of the stabilized polymer composition may be one or more salts of the aforementioned organic acids and/or one or more salts of the aforesaid alcohols. The organic acid may be monobasic or polybasic, saturated or unsaturated, branched-chain or straight-chain, and substituted or unsubstituted provided that any substituent or substitutents are inert during formulation; that is, are free from any interfering functional group or groups that would cause or result in the occurrence of undesirable side reactions. For example, —OH— groups are permissible substitutents; and, in fact, the available evidence indicates that they are desirable. Or, the substituents may be, for instance an —OR— group where R represents an alkyl radical such as a lower alkyl radical, specifically a $C_1$ through $C_5$ alkyl radical.

Illustrative examples of organic acids that may be employed in producing the aforementioned metal salts are the unsubstituted, straight-chain, saturated, aliphatic, monocarboxylic acids having from 2 through 30 carbon atoms, viz., ethanoic, propanoic, butanoic and higher members of the homologous series through triaconatanoic (melissic), $C_{29}H_{59}COOH$; the corresponding branched-chain, saturated, aliphatic, monocarboxylic acids, e.g., alphamethylbutyric (2-methylbutanoic), isovaloric (3-methylbutanoic), pivalic (2,2-dimethylpropanoic) and 2-ethylhexoic (octoic); the monoethylenically unsaturated, aliphatic, monocarboxylic acids having up to and including about 30 carbon atoms, e.g., 4 decenoic, caproleic, 10-undecenoic, lauroleic, 5-tetradecenoic, myristoleic, palmitoleic, cis-6-octadecenoic, trans-6-octadecenoic, oleic, elaidic, trans-11-octadecenoic, cis-9-eicosenoic, 11 docosenoic, erucic, brassidic, cis-15-tetracosenoic, and 17-hesacosenoic.

Still other examples of useful organic acids that may be employed in making the transition metal salts are the di-, tri and higher polyethylenically unsaturated aliphatic, monocarboxylic acids having up to and including about 30 carbon atoms, e.g., sorbic, linoleic, linolelaidic, hiragonic, -eleostearic, β-eleostearic, punicic, linolenic, elaidolinolenic, pseudoeleostearic, moroctic, -parinairic, β-parinaric, arachidonic, clupanodonic and nisinic.

As indicated hereinbefore, transition metal salts of hydroxy-substituted carboxylic acids having up to and including 30 carbon atoms are particularly suitable for use in practicing this invention, for example, the transition metal ricinoleates. Additional specific examples of other acids of this same sub-group that similarly may be employed are alpha-hydroxy-decanoic, 3-hydroxydecanoic acid having the formula $CH_3(CH_3)_6CHOHCH_2COOH$ 12-hydroxydodecanoic (sabinic), 16-hydroxyhexadecanoic (juniperic), 10-hydroxyhexadecanoic, 12-hydroxyoctadecanoic, 10-hydroxy-8-octadecenoic, DL-erythro-9, 10-dehydroxyoctadecanoic and lanoceric acid.

Illustrative examples of other substituted organic acids, the transition metal salts of which may be employed in practicing this invention, are the various keto-substituted aliphatic monocarboxylic acids, e.g., pyruvic, acetaocetic, 4-oxooctadecanoic, 6-oxooctadecanoic, 10-oxooctadecanoic, 17-oxooctadecanoic, 13-oxodotriacontanoic, 13-oxohexatetracontanoic, alpha-licanic, 6,7-dioxooctadecanoic and 9,10-dioxooctadecanoic acids.

Examples of still other monocarboxylic acids that may be used in making the transition metal salts are the various hydroxy-substituted toluic acids including 2- and 3-paratoluic acids, etc.; the aryl-substituted aliphatic monocarboxylic acids, e.g., phenylacetic (alpha-toluic) acid, etc.; dihydroxy monocarboxylic acids, e.g., glyceric acids; and others up to 30 carbon atoms (preferably up to not more than about 20 carbon atoms).

Instead of using transition metal salts of monobasic acids, one may employ transition metal salts of di, tri and higher polybasic acids. Examples of such acids are the saturated dicarboxylic acids having from 2 through 30 carbon atoms, including oxalic, malonic, succinic, glutaric, adipic, pimelic, suberic, sebacic, azelaic and higher members of the homologous series up to and including about 30 carbon atoms; tricarballylic and other higher polycarboxylic acids, ethylenically unsaturated polybasic acids, e.g., fumaric, maleic, itaconic, citraconic, mesaconic and aconitic acids; aromatic polycarboxylic acids, e.g., phthalic, terephthalic, isophthalic and chlorophthalic acids; and the various hydroxy-substituted polycarboxylic acids, e.g., ctric, tartronic, malic, tartaric, dihydroxy-succinic, saccharic, mucic, etc.; as well as other acids having from 2 up to about 30 carbon atoms that will be readily apparent to the skilled chemist.

Illustrative examples of alcohols of which the transition metal salts or alcoholates can be made and used in practicing this invention are those alcohols which are free from a carboxyl group or groups, but otherwise correspond to the carboxylic acids hereinbefore given by way of illustration. Among such alcohols may be mentioned the straight-chain and branched-chain, saturated, monohydric alcohols, such as ethanol and the normal and isomeric forms of propanol through triacontanol; and the mono-, di- and higher polyethylenically unsaturated monohydric alcohols corresponding to the aforementioned saturated monohydric alcohols including, for example, allyl methallyl, crotyl, cinnamyl, alpha-phenylally, 3-buten-2-ol, 1-penten-3, ol, 3-penten-2-ol, 4-penten-1-ol, 4-penten-2-ol, 3-ethyl-5-hexen-3-ol and higher members of the homologeous series.

Still other examples include alcohol-ethers, e.g., the monoethyl, -buty, -phenyl, and -benzyl ethers of ethylene glycol and of diethylene glycol, propylene glycol monomethyl ether, pentylene glycol monoethyl ether, decyclene glycol monophenyl ether and dibutylene glycol monobutyl ether.

Other specific examples include various polyhydric alcohols containing up to about 30 carbon atoms, e.g., ethylene glycol, diethylene glycol, triethylene glycol, tetraethylene glycol, hexamethylene glycol, decamethylene glycol, 2-ethyl-1,3-hexanediol, 1,3-butylene glycol, pentaethylene glycol, heptaethylene glycol, octaethylene glycol, decaethylene glycol, 2-butyl-1,3-octanediol, 2-ethyl-2-methylol-1-hexanol, 6-methyl-2,4-heptanediol, glycerol, erythritol, pentaerythritol, dipentaerythritol, adonitol, xylitol, arabitol, mannitol, dulcitol, sorbitol, trimethylol-propane, cocceryl alcohol, and others that will be apparent to those skilled in the art.

The use of transition metal salts of ethylnoid (acetylenically unsaturated) aliphatic carboxylic acids and transition metal salts of ethynoid alcohols, which salts are available or can be prepared, is not precluded in producing the stabilized oxymethylene polymer compositions of this invention. Also within the scope of this invention is the use of the transition metal salts of alicyclic (e.g., naphthenic) compounds containing at least one carboxylic acid group and/or at least one alcoholic hydroxyl group.

Surprisingly, in accordance with the present invention, it has been found that very small amounts of the transition metal costabilizer greatly increases the thermal stability of the polymer. Importantly, the addition of the transition metal stabilizer in the very small amounts contemplated does not adversely increase the low levels of extractable formaldehyde characteristic of oxymethylene polymers stabilized by superpolyamides alone.

The preferred stabilizing system useful in the compositions of the present invention can be characterized as a superpolyamide-based stabilizer system and is an attempt to improve the properties of oxymethylene polymers containing superpolyamide stabilizers. However, it is to be understood that the combination of stabilizers used in the present invention is meant to cover all practical amounts of the individual stabilizers, although it is preferred that the amount of the transition metal stabilizer remain small in proportion to the superpolyamide to maintain the stabilizing system, in fact, one based on the superpolyamide. As has been found, increasing the levels of the transition metal costabilizer has an adverse affect on the color of the molded articles formed from such compositions. Thus, the preferred stabilizer employed in the present invention will contain in relative terms, a major amount of a superpolyamide stabilizer and a minor amount of the transition metal stabilizer. The superpolyamide stabilizer is present in the composition in an amount of from about 0.05 to about 2 wt. %, more preferably about 0.1 to about 0.5 wt. %. A particularly preferred amount of the superpolyamide stabilizer is from about 0.10 to about 0.35 wt. % based on the total weight of the composition.

The transition metal salt as above described will comprise a minor portion of the total stabilizing system and will be present in practical limits in an amount of from about 0.001 to about 1 wt. %, more preferably from about 0.005 to about 0.1 wt. %. A particularly preferred amount is from about 0.01 to about 0.05 wt. % based on the total weight of the composition.

In addition to the above chain-scission inhibitors other stabilizing additives are preferably admixed with the oxymethylene polymer, for example, an antioxidant ingredient such as a phenolic antioxidant. Useful antioxidants are the various substituted bisphenols and, more particularly the alkylene bisphenols, including compounds having from 1 to 4 carbon atoms in the alkylene grouping and from zero to two alkyl substitutents on each benzene ring, each of the alkyl substituents containing from 1 to 4 carbon atoms. The preferred alkylene bisphenols are hexamethylene bis (3,5di-tert-butyl-4-hydroxy cinnamate); tetrakis[methylene 3 (3',5'di-tert-butyl-4'-hydroxyphenyl)propionate]methane; 2,2'methylene bis(4-methyl-6-tertiary-butylphenol) and 4,4'-butylidene bis(3-methyl-6-tertiary-butylphenol). Suitable phenolic antioxidants other than the alkylene bisphenols include 2,6-di-(tertiary-butyl)-4-methylphenol, p-phenylphenol and octylphenol.

The amount of the phenolic antioxidant, e.g., an alkylene bisphenol, which is employed is usually not more than about 5 weight percent, more particularly from 0.05 to about 2.0 weight percent, based on the weight of the oxymethylene polymer. A preferred range of phenolic antioxidant is from about 0.1 to about 1.0%, still more preferably from 0.3 to 1.0%, by weight of the polymeric oxymethylene.

The superpolyamide and the transition metal salt stabilizers can be added into the oxymethylene polymer either together, one at a time, or premixed and subsequently blended with the oxymethylene polymer.

The stabilized oxymethylene polymer compositions of the present invention are prepared by admixing the stabilizers with the unstabilized polymer in any suitable manner, whereby a substantially homogenous composition is obtained. For example, the stabilizers may be incorporated into the oxymethylene polymer by dissolving both the polymer and the stabilizers in a common solvent and thereafter evaporating the solution to dryness. Alternatively, the stabilizers may be admixed intimately with the oxymethylene polymer by being applied in solution in a suitable solvent to the finely divided solid oxymethylene polymer followed by evaporation of the solvent.

The admixture may also be made by dry blending the finely divided oxymethylene polymer and finely divided stabilizers followed by extrusion or melt compounding or by milling the stabilizers into the polymer as the latter is worked on a rubber mill.

The stabilized oxymethylene polymer compositions also include if desired, plasticizers, pigments, lubricants and other stabilizers, e.g., stabilizers against degradation by ultraviolet light, e.g., 2,2'-dihydroxy-4,4'-dimethoxy-benzophenonone; 2-hydroxy-4-methoxy-benzophenone; 2-hydroxy-4-methoxyl-chlorobenzophenone, nucleants, UV screens and absorbers, metal soaps, reinforcers and filler such as glass, talc, white mica and gold mica, polymeric substances such as ethylene vinyl acetate, polyurethanes, impact modifiers, and color pigments which are compatible with oxymethylene polymers, e.g., red pigments such as azo dye and cadmium sulfide-cadmium selenide reds and "Mercadium" reds, blue pigments such as phthalocyanine blues, green pigments such as chromium oxide greens, white pigments such as titanium dioxide whites, and black pigments such as carbon blacks which can be incorporated in amounts of up to about 5% by weight, based upon the total weight of the composition.

The following examples present illustrative but non-limiting embodiments of the present invention. Unless otherwise stated, the oxymethylene polymers used in the following examples are oxymethylene copolymers of trioxane and ethylene oxide which were prepared as described in Example 1 of U.S. Pat. No. 3,254,053. Catalyst residues in the polymer were deactivated with an amine as described in U.S. Pat. No. 2,989,509, and the copolymers were then subjected to either the melt hydrolysis process or the solution hydrolysis process as described in U.S. Pat. No. 3,318,848 and U.S. Pat. No. 3,174,948, to remove unstable terminal units.

The various analysis referred to in the examples were conducted as follows:

HUNTER COLOR

Hunter color is a standard color measurment procedure used for testing colored and natural plastic materials. A 2" disk was molded for the measurement. This disk was inserted in a calibrated Hunter Colorimeter set in the reflectance mode. Three parameters (L, a, b,) were obtained which define the brightness and color of the disk.

EXTRACTABLE FORMALDEHYDE: was measured by boiling 100 grams of sample in 100 ml distilled water at reflux for 60 minutes. The extract was then neutralized with potassium hydroxide (0.1N) solution and the final pH was noted. Fifty milliliters of sodium sulfite (0.1N) solution was added to the extract. This final solution was then titrated with sulfuric acid (0.1N) to the original pH level noted previously. An extractable formaldehyde value was calculated from the following formula:

% extractable formaldehyde = $(T \times N \times 3)/W$ where

T = milliliters of sulfuric acid
N = normality of sulfuric acid
W = exact sample weight in grams THE THERMAL DEGRADATION RATE OF THE POLYMER ($K_{D230}$): was measured by determining the percent weight loss of a sample of the polymer heated in an open vessel in a circulating air oven at 230° C. For example, the $K_{D230}$ of an unstabilized oxymethylene copolymer of trioxane and ethylene oxide, which was subjected to hydrolysis to remove unstable end groups, is well over 1 percent per minute and generally results in a complete loss after 45 minutes at 230° C.

EXAMPLE 1

Composition Samples 1 through 8 were prepared by mixing the components in a tumble blender, extruding the mixture using a 1½" Johnson extruder and a molding at a temperature of 390° F. The oxymethylene polymer composition was a mixture comprising 50% of MH copolymer (melt hydrolysis polymer) and 50% SH copolymer (solution hydrolysis polymer). All compositions contained the conventional hindered-phenol type antioxidant, a mold release agent and a nucleant in amounts typically employed by those skilled in the art to which the present invention pertains. The superpolyamide utilized was a commercial stabilizer comprising a terpolymer of approximately 38% polycaprolactam/35% polyhexamethylene adipamide/27% polyhexamethylene sebacamide. Comparative examples of cerium ethyl hexanoate and superpolyamide used alone were made along with the combined stabilizer system which is exemplary of the present invention. The molded test samples were subjected to Kd thermal degradation, extractable formaldehyde and Hunter color evaluation. The results are summarized in Table I.

TABLE I

| | Cerium Salt/Superpolyamide Combination | | | | | | | |
|---|---|---|---|---|---|---|---|---|
| | Composition (wt. %) | | | Extractable | | Hunter Color | | |
| Sample Number | Cerium Ethyl Hexanoate | Superpolyamide | Kd %/Min. | Formaldehyde % | Color, Pellets | L | A | B |
| 1 | .2 | | .020 | .033 | Yellow | 60.5 | 7.9 | 17.61 |
| 2 | .1 | | .022 | .037 | Yellow | 72.1 | 6.4 | 19.30 |
| 3 | | .2 | .013 | .014 | White | 96.3 | −2.2 | 6.80 |
| 4 | | .1 | .014 | .014 | White | 96.7 | −1.5 | 3.81 |
| 5 | 0.05 | 0.05 | .017 | .023 | Lt. Yellow | 90.0 | −.55 | 13.85 |
| 6 | .001 | .1 | .012 | .018 | White | 95.1 | −1.4 | 5.59 |
| 7 | .01 | .1 | .009 | .015 | White | 95.1 | −1.4 | 5.60 |
| 8 | | .05 | .025 | .014 | White | 96.4 | −1.3 | 3.80 |

As can be seen from Table I and, in particular, Sample Nos. 1 and 2, the amounts of cerium salt as suggested in the prior art greatly increase the color of the oxymethylene polymer samples. Comparing Samples 1 and 2 with Samples 3 and 4, which latter samples contained the superpolyamide as the sole stabilizer, it can be seen that the superpolyamide imparts greater thermal stability, lower extractable formaldehyde levels and better color than the cerium salt used as the sole stabilizer. Even at levels of 0.05 wt. % of the cerium salt (Sample 5), the color of the oxymethylene polymer sample is still quite high, although, in comparing Sample 5 with Sample 8 which contained small amounts of the superpolyamide as sole stabilizer, the combined stabilizer of Sample 5 improved the thermal stability. From Samples 6 and 7, it can be seen that compositions containing small amounts of the cerium salt relative to the superpolyamide greatly improved the thermal stability of the oxymethylene polymer sample while not increasing the extractable formaldehyde levels or degrading the color of the sample. It is thus possible, that the use of the transition metal salt/superpolyamide costabilizing system may allow a reduction in the polyamide content that is needed to minimize problems with black specks and mold deposits which are associated with the superpolyamide stabilizer.

EXAMPLE 2

Oxymethylene polymer compositions were prepared as in Example 1. The thermal stabilizer for each example comprised 0.25 wt. % of the superpolyamide as in Example 1 and 0.05 wt. % of the various transition metal salts listed in Table II. Also set forth in Table II is the amount of the hindered phenol oxidant (Irganox 259) which was utilized. Thermal degradation, extractable formaldehyde and Hunter color evaluation are set forth for the various transition metal salt costabilizers in Table II.

TABLE II

METAL SALTS IN POM COPOLYMER

| Metal Salt | Irganox 259 % | Kd %/Min. | Ext. CH$_2$O, % | Hunter L | A | B |
|---|---|---|---|---|---|---|
| Cerium Ethyl Hexanoate | .5 | .009 | .003 | 85.4 | −.16 | 9.14 |
| Cobalt (II) acetyl acetonate (acac) | .5 | .013 | .006 | 79.4 | 2.34 | 13.85 |
| Cobalt (III) acac | .5 | .019 | .011 | 76.4 | 2.75 | 15.20 |
| Cobalt porphyrin chloride | .5 | .009 | .005 | 84.2 | −.80 | 7.28 |
| Cu (II) acac | .5 | .009 | .002 | 28.0 | −2.4 | −1.33 |
| Mn (II) acac | .5 | .025 | .013 | 73.4 | 4.41 | 19.2 |
| Fe (III) acac | .5 | .015 | .011 | 61.7 | 7.89 | 19.9 |
| Cr (III) acac | .5 | .022 | .009 | 73.0 | −3.0 | 12.55 |
| Ce (III) acac | .5 | .012 | .009 | 75.0 | 2.80 | 15.4 |
| Ce (III) acac | .2 | .077 | .008 | 83.0 | 0.56 | 11.70 |
| — | .2 | .099 | .006 | 89.6 | −.60 | 3.1 |
| — | .5 | .014 | .004 | 90.0 | −.72 | 3.1 |

What is claimed is:

1. An oxymethylene polymer composition which comprises an oxymethylene polymer having incorporated therein stabilizing amounts of a superpolyamide and a transition metal salt of an organic acid or alcohol, wherein the transition metal salt of an organic acid group consisting of iron, cobalt, nickel, lathanide metals, chromium, manganese and copper.

2. The composition of claim 1 wherein said superpolyamide stabilizer is present in amounts of from about 0.05 to about 2 wt. % and said transition metal compound is present in amount of from about 0.001 to about 1 wt. % based on the total weight of the composition.

3. The composition of claim 2 wherein said superpolyamide stabilizer is present in amounts of from about 0.1 to about 0.5 wt. % based on the total weight of the composition.

4. The composition of claim 3 wherein said superpolyamide stabilizer is present in amounts of from about 0.1 to about 0.35 wt. % based on the total weight of the composition.

5. The composition of claim 1 wherein said oxymethylene polymer is selected from the group consisting of:
   (i) oxymethylene homopolymer,
   (ii) oxymethylene copolymer comprising about 60 to about 99.6 percent recurring —OCH$_2$— groups interspersed with groups of the formula:

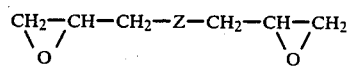

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and halo-alkyl-substituted methylene, and lower alkyl and haloalkyl-substituted oxymethylene radicals and n is an integer from 0 to 3, inclusive, and
   (iii) oxymethylene terpolymer, which is the reaction product of trioxane, a cyclic ether and/or cyclic acetal, and a diglycide of the formula:

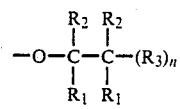

wherein Z is selected from the group consisting of a carbon-to-carbon bond, oxygen, an oxyalkoxy of 1 to 8 carbon atoms, and an oxypoly (lower alkoxy).

6. The composition of claim 5 wherein said oxymethylene polymer is said copolymer.

7. The composition of claim 6 wherein the copolymer is a copolymer of trioxane and ethylene oxide, 1,3-dioxolane or both.

8. The composition of claim 1 wherein said metal comprises a lanthanide metal.

9. The composition of claim 8 wherein said lanthanide metal is cerium.

10. An oxymethylene polymer composition which comprises an oxymethylene polymer and a stabilizing amount of a superpolyamide and from about 0.001 to about 1 wt. % based on the total weight of the composition of a transition metal salt of an organic acid or alcohol, wherein the transition metal is selected from the group consisting of iron, cobalt, nickel, lanthanide metals, chromium, manganese and copper, said transition metal salt being present in minor amounts relative to the amount of said superpolyamide present.

11. The composition of claim 10 wherein said transition metal salt is present in amounts of from about 0.005 to about 1 wt. % based on the total weight of the composition.

12. The composition of claim 11 wherein said transition metal salt is present in amounts of from about 0.01 to about 0.05 wt. % based on the total weight of the composition.

13. The composition of claim 10 wherein said oxymethylene polymer wherein the oxymethylene polymer is selected from the group consisting of:
(i) oxymethylene homopolymer,
(ii) oxymethylene copolymer comprising about 60 to about 99.6 percent recurring —OCH$_2$— groups interspersed with groups of the formula:

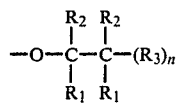

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and halo-alkyl-substituted methylene, and lower alkyl and haloalkyl-substituted oxymethylene radicals and n is an integer from 0 to 3, inclusive, each lower alkyl radical having from 1 to 2 carbon atoms, inclusive, and
(iii) oxymethylene terpolymer, which is the reaction product of trioxane, a cyclic ether and/or cyclic acetal, and a diglycide of the formula:

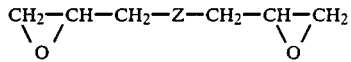

wherein Z is selected from the group consisting of a carbon-to-carbon bond, oxygen, an oxyalkoxy of 1 to 8 carbon atoms, and an oxypoly (lower alkoxy).

14. The composition of claim 10 wherein said oxymethylene polymer is said copolymer.

15. The composition of claim 10 wherein the copolymer is a copolymer of trioxane and ethylene oxide, 1,3-dioxolane or both.

16. The composition of claim 12 wherein said metal comprises a lanthanide metal.

17. The composition of claim 16 wherein said metal is cerium.

18. The composition of claim 10 wherein said metal comprises a lanthanide metal.

19. The composition of claim 18 wherein said metal is cerium.

* * * * *